(12) United States Patent
Kumar et al.

(10) Patent No.: US 9,133,386 B2
(45) Date of Patent: Sep. 15, 2015

(54) VISCOUS SETTABLE FLUID FOR LOST CIRCULATION IN SUBTERRANEAN FORMATIONS

(71) Applicant: Halliburton Energy Services, Inc., Houston, TX (US)

(72) Inventors: Arunesh Kumar, London (GB); Sharath Savari, Kingwood, TX (US); Jason T. Scorsone, Houston, TX (US); Rajendra A. Kalgaonkar, Pune (IN)

(73) Assignee: Hallburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/712,539

(22) Filed: Dec. 12, 2012

(65) Prior Publication Data

US 2014/0158354 A1    Jun. 12, 2014

(51) Int. Cl.
| | |
|---|---|
| *C09K 8/512* | (2006.01) |
| *C04B 28/14* | (2006.01) |
| *C04B 28/26* | (2006.01) |
| *C09K 8/467* | (2006.01) |
| *C09K 8/487* | (2006.01) |
| *E21B 21/00* | (2006.01) |
| *C09K 8/504* | (2006.01) |
| *C04B 103/10* | (2006.01) |
| *C04B 103/44* | (2006.01) |
| *C04B 111/00* | (2006.01) |

(52) U.S. Cl.
CPC ............ *C09K 8/512* (2013.01); *C04B 28/14* (2013.01); *C04B 28/26* (2013.01); *C09K 8/467* (2013.01); *C09K 8/487* (2013.01); *C09K 8/5045* (2013.01); *E21B 21/003* (2013.01); *C04B 2103/10* (2013.01); *C04B 2103/445* (2013.01); *C04B 2111/00008* (2013.01); *C04B 2111/00146* (2013.01); *C09K 2208/10* (2013.01)

(58) Field of Classification Search
USPC .......................................... 166/293
See application file for complete search history.

(56) References Cited

U.S. PATENT DOCUMENTS

| | | | | |
|---|---|---|---|---|
| 4,564,070 A * | 1/1986 | Norton | ............... | 166/295 |
| 5,149,370 A | 9/1992 | Olaussen et al. | | |
| 5,320,171 A | 6/1994 | Laramay | | |
| 5,355,954 A * | 10/1994 | Onan et al. | ............... | 166/292 |
| 5,447,197 A * | 9/1995 | Rae et al. | ............... | 166/293 |
| 6,664,215 B1 | 12/2003 | Tomlinson | | |
| 7,013,973 B2 | 3/2006 | Danican | | |
| 7,044,222 B2 | 5/2006 | Tomlinson | | |
| 7,458,424 B2 | 12/2008 | Odeh et al. | | |
| 7,621,186 B2 * | 11/2009 | Heathman et al. | ............... | 73/803 |
| 7,740,068 B2 * | 6/2010 | Ballard | ............... | 166/294 |
| 7,934,557 B2 * | 5/2011 | Nguyen | ............... | 166/295 |
| 7,954,549 B2 | 6/2011 | Lende et al. | | |
| 2005/0159319 A1 * | 7/2005 | Eoff et al. | ............... | 507/225 |
| 2011/0094746 A1 * | 4/2011 | Allison et al. | ............... | 166/308.5 |
| 2011/0114318 A1 * | 5/2011 | Ezell et al. | ............... | 166/305.1 |
| 2011/0162845 A1 | 7/2011 | Ravi et al. | | |
| 2011/0272142 A1 * | 11/2011 | Lewis et al. | ............... | 166/247 |
| 2012/0181029 A1 | 7/2012 | Saini et al. | | |
| 2013/0292120 A1 * | 11/2013 | Patil et al. | ............... | 166/293 |

FOREIGN PATENT DOCUMENTS

| | | |
|---|---|---|
| EP | 0260888 A2 | 3/1988 |
| WO | 2009-133339 A2 | 11/2009 |
| WO | 2010-115523 A1 | 10/2010 |

OTHER PUBLICATIONS

Duo Squeeze H Product Data Sheet, Baroid Fluid Services, Halliburton 2008.
Fuse It, Baroid Fluid Services, SDS-049, Halliburton May 2006.
Boyce. "Development and Evaluation of a New Environmentally Acceptable Conformance Sealant" SPE 142417, Jun. 7-10, 2011.
Form Seal Services. Halliburton, 2009. HXXXX Mar. 2009.
GasCon 469 LM Cement Additive. Halliburton, 2012. H09436 Jul. 2012.
Thermatek Service. Halliburton, 2005. H03829 May 2005.
N-Squeeze Product Data Sheet. Halliburton Baroid, Mar. 26, 2010.
N-Plex Product Data Sheet. Halliburton Baroid, Mar. 26, 2010.
Thermatek RSP Rapid Set Plug Service. Halliburton, 2008. H06188 Mar. 2008.
Boyce. "Development and Evaluation of a New Environmentally Acceptable Conformance Sealant" SPE 142417, 2011.
Qiu, Dong et al., "Formation of functional phosphosilicate gels from phytic acid and tetraethyl orthosilicate", Journal of Sol-Geo Science and Technology, (2008) vol. 48, issue 3, pp. 378-383.
International Search Report issued in related International Patent Application No. PCT/US2013/070689 mailed Feb. 21, 2014, 3 pages.

* cited by examiner

*Primary Examiner* — Angela M DiTrani
(74) *Attorney, Agent, or Firm* — Holly Soehnge; Baker Botts L.L.P.

(57) ABSTRACT

A method of treating a well the method including the steps of: (A) forming a fluid including: (i) a shear-thinning aqueous liquid phase; and (ii) an inorganic setting material; wherein the fluid is shear-thinning, pumpable, and settable; and (B) introducing the fluid into the well.

26 Claims, No Drawings

VISCOUS SETTABLE FLUID FOR LOST CIRCULATION IN SUBTERRANEAN FORMATIONS

CROSS-REFERENCE TO RELATED APPLICATIONS

Not applicable.

TECHNICAL FIELD

The inventions are in the field of producing crude oil or natural gas from subterranean formations. More specifically, the inventions generally relate to controlling drilling fluid loss or other lost circulation in a well.

BACKGROUND

To produce oil or gas, a well is drilled into a subterranean formation that is an oil or gas reservoir. The well is created by drilling a hole into the earth (or seabed) with a drilling rig that rotates a drill string with a drilling bit attached to the downward end. Usually the borehole is anywhere between about 5 inches (13 cm) to about 36 inches (91 cm) in diameter. As upper portions are cased or lined, progressively smaller drilling strings and bits must be used to pass through the uphole casings or liners, which steps the borehole down to progressively smaller diameters.

While drilling an oil or gas well, a drilling fluid is usually circulated downhole through a drillpipe to a drill bit at the downhole end, out through the drill bit into the wellbore, and then back uphole to the surface through the annular path between the tubular drillpipe and the borehole. The purpose of the drilling fluid is, but not limited to, to lubricate the drill string, maintain hydrostatic pressure in the wellbore, and carry rock cuttings out from the wellbore.

The drilling fluid can be water-based or oil-based. Oil-based drilling fluids tend to have better lubricating properties than water-based drilling fluids, nevertheless, other factors can mitigate in favor of using a water-based drilling fluid.

After terminating the circulation of the drilling fluid, a string of pipe, e.g., casing, is run in the wellbore. Next, primary cementing is typically performed whereby a cement slurry is placed in the annulus and permitted to set into a hard mass (e.g., a sheath) to thereby attach the string of pipe to the walls of the wellbore and seal the annulus. The main objectives of primary cementing operations include zonal isolation to prevent migration of fluids in the annulus, support for the casing or liner string, and protection of the casing string from corrosive formation fluids.

Oil or gas in the subterranean formation may be produced by flowing fluid into the well using, for example, a pressure gradient that exists between the formation and the wellbore, the force of gravity, displacement of the fluid using a pump or the force of another fluid injected into the well or an adjacent well. The production of fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well.

Fluids used in drilling, completion, or servicing of a wellbore can be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. The extent of fluid losses to the formation may range from minor (for example less than 10 bbl/hr) referred to as seepage loss to severe (for example, greater than 100 bbl/hr), or higher, which is sometimes referred to as complete fluid loss. As a result, the service provided by such fluid is more difficult or costly to achieve. For example, a drilling fluid may be lost to the formation, resulting in the circulation of the fluid in the wellbore being too low to allow for further drilling of the wellbore.

SUMMARY OF THE INVENTION

The invention provides a method of treating a well, the method including the steps of: (A) forming a fluid including: (i) a shear-thinning aqueous liquid phase; and (ii) an inorganic setting material; wherein the fluid is shear-thinning, pumpable, and settable; and (B) introducing the fluid into the well.

The invention also provides a composition comprising: (i) a shear-thinning aqueous liquid phase; and (ii) an inorganic setting material; wherein the fluid is shear-thinning, pumpable, and settable.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF PRESENTLY PREFERRED EMBODIMENTS AND BEST MODE

Definitions and Usages

Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The control or controlling of a condition includes any one or more of maintaining, applying, or varying of the condition. For example, controlling the temperature of a substance can include maintaining an initial temperature, heating, or cooling.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. are assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there by any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Oil and Gas Reservoirs

In the context of production from a well, however, oil and "gas" are understood to refer to crude oil and natural gas, respectively. Oil and gas are naturally occurring hydrocarbons in certain subterranean formations. Petroleum is a complex mixture of hydrocarbons.

A "subterranean formation" is a body of rock that has sufficiently distinctive characteristics and is sufficiently continuous for geologists to describe, map, and name it.

In geology, rock or stone is a naturally occurring solid aggregate of minerals or mineraloids. The Earth's outer solid layer, the lithosphere, is made of rock. Three majors groups of rocks are defined: igneous, sedimentary, and metamorphic.

A subterranean formation having a sufficient porosity and permeability to store and transmit fluids is sometimes referred to as a "reservoir." The vast majority of reservoir rocks are sedimentary rocks, but highly fractured igneous and metamorphic rocks sometimes contain substantial reservoirs as well.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Services and Well Fluids

To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or well fluids can be directed from the wellhead into any desired portion of the wellbore.

As used herein, the word "tubular" means any kind of body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location.

A "bottom hole assembly" is the lower portion of a drill string, including at least a bit, stabilizers, a drill collar, jarring devices ("jars"), and at least one bottom hole tool selected from the group consisting of measurement while drilling (MWD) tools, logging while drilling (LWD) tools, and seismic while drilling (SWD) tools. These types of bottom hole tools have fluid flow paths, which can be problematic for use of conventional cementing compositions.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrate some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an annulus is a space through which a fluid can flow.

As used herein, a "well fluid" broadly refers to any fluid adapted to be introduced into a well for any purpose. A well fluid can be, for example, a drilling fluid, a settable composition, a treatment fluid, or a spacer fluid. If a well fluid is to be used in a relatively small volume, for example less than about 200 barrels (about 8,400 US gallons or about 32 m³), it is sometimes referred to as a wash, dump, slug, or pill.

Drilling fluids, also known as drilling muds or simply "muds," are typically classified according to their base fluid, that is, the nature of the continuous phase. A water-based mud ("WBM") has a water phase as the continuous phase. The water can be brine. A brine-based drilling fluid is a water-based mud in which the aqueous component is brine. In some cases, oil may be emulsified in a water-based drilling mud. An oil-based mud ("OBM") has an oil phase as the continuous phase. In some cases, a water phase is emulsified in the oil-based mud.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A "portion" of a well refers to any downhole portion of the well.

A zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

As used herein, a downhole fluid is an in-situ fluid in a well, which may be the same as a well fluid at the time it is introduced, or a well fluid mixed with another other fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment at the time of a treatment. For example, the design temperature for a well treatment takes into account not only the bottom hole static temperature ("BHST"), but also the effect of the temperature of the well fluid on the BHST during treatment. The design temperature for a well fluid is sometimes referred to as the bottom hole circulation temperature ("BHCT"). Because well fluids may be considerably cooler than BHST, the difference between the two temperatures can be quite large. Ultimately, if left undisturbed, a subterranean formation will return to the BHST.

Physical States, Phases, and Materials

The common physical states of matter include solid, liquid, and gas. A solid has a fixed shape and volume, a liquid has a fixed volume and conforms to the shape of a container, and a gas disperses and conforms to the shape of a container. Distinctions among these physical states are based on differences in intermolecular attractions. Solid is the state in which intermolecular attractions keep the molecules in fixed spatial relationships. Liquid is the state in which intermolecular attractions keep molecules in proximity (low tendency to disperse), but do not keep the molecules in fixed relationships. Gas is that state in which the molecules are comparatively separated and intermolecular attractions have relatively little effect on their respective motions (high tendency to disperse).

In addition, the solid state includes a plastic state, that is, a material that has plasticity. Plasticity describes the deformation of a material undergoing non-reversible changes of shape in response to applied forces.

As used herein, "phase" is used to refer to a substance having a chemical composition and physical state that is distinguishable from an adjacent phase of a substance having a different chemical composition or a different physical state.

The word "material" is anything made of matter, constituted of one or more phases. Rock, water, air, metal, cement slurry, sand, and wood are all examples of materials. The word "material" can refer to a single phase of a substance on a bulk scale (larger than a particle) or a bulk scale of a mixture of phases, depending on the context.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), e.g., microscopic clay particles, to about 3 millimeters, e.g., large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

It should be understood that the terms "particle" and "particulate," includes all known shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

As used herein, a fiber is a particle or grouping of particles having an aspect ratio of length to diameter (L/D) greater than 5/1.

A particulate will have a particle size distribution ("PSD"). As used herein, "the size" of a particulate can be determined by methods known to persons skilled in the art.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have sizes between the two mesh sizes.

Particulate materials are sometimes described by a single mesh size, for example, 100 U.S. Standard mesh. If not otherwise stated, a reference to a single particle size means about the mid-point of the industry-accepted mesh size range for the particulate.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified different ways, including, for example, based on the size of the dispersed particles, the uniformity or lack of uniformity of the dispersion, and, if a fluid, whether or not precipitation occurs.

A dispersion is considered to be heterogeneous if the dispersed particles are not dissolved and are greater than about 1 nanometer in size. (For reference, the diameter of a molecule of toluene is about 1 nm and a molecule of water is about 0.3 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

Heterogeneous dispersions can be further classified based on the dispersed particle size.

A heterogeneous dispersion is a "suspension" where the dispersed particles are larger than about 50 micrometers. Such particles can be seen with a microscope, or if larger than about 50 micrometers (0.05 mm), with the unaided human eye. The dispersed particles of a suspension in a liquid external phase may eventually separate on standing, e.g., settle in cases where the particles have a higher density than the liquid phase. Suspensions having a liquid external phase are essentially unstable from a thermodynamic point of view; however, they can be kinetically stable over a long period depending on temperature and other conditions.

A heterogeneous dispersion is a "colloid" where the dispersed particles range up to about 1 micrometer (1,000 nanometers) in size. The dispersed particles of a colloid are so small that they settle extremely slowly, if ever. In some cases, a colloid can be considered as a homogeneous mixture. This is because the distinction between "dissolved" and "particulate" matter can be sometimes a matter of theoretical approach, which affects whether or not it is considered homogeneous or heterogeneous.

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Hydratability or Solubility

As referred to herein, "hydratable" means capable of being hydrated by contacting the hydratable agent with water. Regarding a hydratable agent that includes a polymer, this means, among other things, to associate sites on the polymer with water molecules and to unravel and extend the polymer chain in the water.

A substance is considered to be "soluble" in a liquid if at least 10 grams of the substance can be dissolved in one liter of the liquid when tested at 77° F. and 1 atmosphere pressure for 2 hours and considered to be "insoluble" if less than 1 gram per liter soluble and "sparingly soluble" for intermediate solubility values.

As will be appreciated by a person of skill in the art, the hydratability, dispersibility, or solubility of a substance in water can be dependent on the salinity, pH, temperature, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

As used herein, a fluid is a substance that behaves as a fluid under Standard Laboratory Conditions, that is, at 77° F. (25° C.) temperature and 1 atmosphere pressure without applied shear.

Every fluid inherently has at least a continuous phase. A fluid can have more than one phase. The continuous phase of a well fluid is a liquid under Standard Laboratory Conditions. For example, a well fluid can be in the form of be a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

As used herein, a water-based fluid means that water or an aqueous solution is the dominant material of the continuous phase, that is, greater than 50% by weight of the continuous phase of the fluid.

In contrast, "oil-based" means that oil is the dominant material by weight of the continuous phase of the fluid. In this context, the oil of an oil-based fluid can be any oil.

In the context of a well fluid, oil is understood to refer to an oil liquid, whereas gas is understood to refer to a physical state of a substance, in contrast to a liquid. In general, an oil is any substance that is liquid under Standard Laboratory Conditions, is hydrophobic, and soluble in organic solvents. Oils have a high carbon and hydrogen content and are relatively non-polar substances, for example, having a polarity of 3 or less on the Snyder polarity index. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is aptly named the boundary layer. For all Newtonian fluids in laminar flow, the shear stress is proportional to the strain rate in the fluid where the viscosity is the constant of proportionality. However for non-Newtonian fluids, this is no longer the case as for these fluids the viscosity is not constant. The shear stress is imparted onto the boundary as a result of this loss of velocity.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear-thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most well fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of centipoise ("cP").

Like other physical properties, the viscosity of a Newtonian fluid or the apparent viscosity of a non-Newtonian fluid may be highly dependent on the physical conditions, primarily temperature and pressure.

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

One aspect of gel state behavior may be described in the art as "lipping," which may be distinguishable from freely pouring when poured out of a container. "Lipping" as used herein refers to a gel being deformable but retaining a coherent structure that has a lower tendency to disperse than a liquid such as water. Fluids are considered lipping if they form a lip when tilted, and that lip will not tear.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or 50 viscometer or a CHANDLER™ 5550 HPHT viscometer, that measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

Unless otherwise specified, the apparent viscosity of a fluid (excluding any suspended solid particulate larger than silt) is measured with a BROOKFIELD™ model Ultra DVIII+ pro" rheometer at a shear rate of 40 l/s, and at a temperature of 77° F. (25° C.) and a pressure of 1 atmosphere. For reference, the viscosity of pure water is about 1 cP.

A substance is considered to be a fluid if it has an apparent viscosity less than 30,000 cP (independent of any gel characteristic).

As used herein, a fluid is considered to be "viscous" if it has an apparent viscosity of 10 cP or higher.

Setting, Setting Materials, and Setting Compositions

As used herein, the term "set" is intended to mean the process of becoming gelled to have an apparent viscosity of greater than 30,000 cP or solid and hard by curing a consistency of at least 70 Bc.

As used herein, a "setting material" is a material that sets, for example, by reacting with water or another chemical or substance.

A setting material can be classified as organic or inorganic. As used herein, unless the context otherwise requires, a setting material refers to an inorganic setting material.

As used herein, a "setting composition" is a composition including at least one setting material. A setting composition can also include additives. Some setting materials or compositions can include water or be mixed with water.

As used herein, a "settable" or "setting" fluid is a fluid or well fluid that sets, is settable, or is adapted to set under certain design conditions.

Some, but not all, settable fluids are cement compositions.

Cement and Cement Compositions

In the most general sense of the word, a "cement" is a binder, that is, a substance that sets and can bind other materials together. As used herein, "cement" refers to inorganic cement that, when mixed with water, will begin to set and harden into a concrete material.

As used herein, a "cement composition" is a material including at least one inorganic cement. A cement composition can also include additives. A cement composition can include water or be mixed with water. Depending on the type of cement, the chemical proportions, when a cement composition is mixed with water it can begin setting to form a single phase solid material.

A cement can be characterized as non-hydraulic or hydraulic.

Non-hydraulic cements (e.g., gypsum plaster, Sorel cements) must be kept dry in order to retain their integrity and strength. A non-hydraulic cement produces hydrates that are not resistant to water. If the proportion of water to a non-hydraulic cement is too high, the cement composition will not set into a hardened material.

For example, calcium sulfate hemihydrate ($CaSO_4.1/2H_2O$) is produced by heating gypsum ($CaSO_4.2H_2O$) to about 300° F. (150° C.), releasing water (as steam). When the dry plaster of Paris powder is mixed with water, it re-forms into gypsum. The setting of unmodified plaster normally starts about 10 minutes after mixing and is complete in about 45 minutes; but not fully set for 72 hours. If plaster or gypsum is heated above about 392° F. (about 200° C.), anhydrite is formed, which will also re-form as gypsum if mixed with water. A large gypsum deposit at Montmartre in Paris led gypsum plaster to be commonly known as "plaster of Paris." Gypsum is moderately water-soluble (about 2.0 to about 2.5 g/l at 25° C.), but, in contrast to most other salts, it exhibits a retrograde solubility, becoming less soluble at higher temperatures.

Sorel cement compositions typically comprise magnesium oxide and a magnesium chloride salt and water, which together form, for example, magnesium oxychloride hydrate. Commercialization efforts for such Sorel cement compositions have often hampered by the settling of magnesium chloride before reaching the well site or while sitting at the well site prior to use. For the Sorel cement composition to set, the magnesium oxide, magnesium chloride, and water need to be present within a particular range of weight or molar ratios. Settling of one of the components causes the reactants to be present in non-stoichiometric amounts, thereby preventing proper setting of the composition.

Hydraulic cements (e.g., Portland cement) harden because of hydration, chemical reactions that occur independently of the mixture's water content; they can harden even underwater or when constantly exposed to wet weather. The chemical reaction that results when the dry cement powder is mixed with water produces hydrates that have extremely low solubility in water. The cement composition sets by a hydration process, and it passes through a gel phase to solid phase.

Well Fluid Placement for Fluid Loss Control

During placement of a setting fluid in a well, it is necessary for the setting composition to remain pumpable during introduction into the subterranean formation or the well and until the setting composition is situated in the portion of the subterranean formation or the well to be cemented. After the setting composition has reached the portion of the well to be cemented, the setting fluid ultimately sets. A setting composition that thickens too quickly while being pumped can damage pumping equipment or block tubing or pipes, and a setting fluid that sets too slowly can cost time and money while waiting for the setting fluid to set or can be lost to the formation and not provide an adequate seal.

Pumping Time and Thickening Time

As used herein, the "pumping time" is the total time required for pumping a setting fluid, such as a cement composition, into a desired portion or zone of the well plus a safety factor.

As used herein, the "thickening time" is how long it takes for a setting well fluid to become unpumpable at a specified temperature and specified pressure. The pumpability of a setting well fluid is related to the consistency of the composition. The consistency of a setting fluid is measured in Bearden units of consistency (Bc), a dimensionless unit with no direct conversion factor to the more common units of viscosity. As used herein, a fluid is considered to be "pumpable" so long as the fluid has an apparent viscosity less than 30,000 cP (independent of any gel characteristic) or a consistency of less than 70 Bc. A setting fluid becomes "unpumpable" when the consistency of the composition reaches at least 70 Bc.

As used herein, the consistency of a setting fluid is measured according to ANSI/API Recommended Practice 10B-2 as follows. The composition is mixed and then placed in the test cell of a High-Temperature, High-Pressure (HTHP) consistometer, such as a FANN™ Model 275 or a CHANDLER™ Model 8240. The setting fluid is tested in the HTHP consistometer at the specified temperature and pressure. Consistency measurements are taken continuously until the consistency of the setting fluid exceeds 70 Bc.

Of course, the thickening time should be greater than the pumping time for a cementing operation.

Setting Composition Test Conditions

As used herein, if any test (e.g., thickening time) requires the step of "mixing the setting fluid" or the like, then the mixing step is performed according to ANSI/API Recommended Practice 10B-2 as follows. Any of the ingredients that are a dry particulate substance are pre-blended. The liquid ingredients are added to a mixing container and the container is then placed on a mixer base. For example, the mixer can be a LIGHTNING™ mixer. The motor of the base is then turned on and maintained at about 4,000 revolutions per minute (rpm). The pre-blended dry ingredients are added to the container at a uniform rate in not more than 15 seconds (s). After all the dry ingredients have been added to the liquid ingredients in the container, a cover is then placed on the container, and the setting fluid is mixed at 12,000 rpm (+/−500 rpm) for 35 s (+/−1 s). It is to be understood that the setting fluid is mixed under Standard Laboratory Conditions (about 77° F. and about 1 atmosphere pressure).

It is also to be understood that if any test (e.g., thickening time or compressive strength) specifies the test be performed at a specified temperature and possibly a specified pressure, then the temperature and pressure of the setting fluid is ramped up to the specified temperature and pressure after being mixed at ambient temperature and pressure. For example, the setting fluid can be mixed at 77° F. and then placed into the testing apparatus and the temperature of the setting fluid can be ramped up to the specified temperature. As used herein, the rate of ramping up the temperature is in the range of about 3° F./min to about 5° F./min. After the setting fluid is ramped up to the specified temperature and possibly pressure, the setting fluid is maintained at that temperature and pressure for the duration of the testing.

As used herein, if any test (e.g., compressive strength) requires the step of "curing the setting fluid" or the like, then the curing step is performed according to ANSI/API Recommended Practice 10B-2 as follows. After the setting fluid has been mixed, it is poured into a curing mould. The curing mould is placed into a pressurized curing chamber and the curing chamber is maintained at a temperature of 212° F. and a pressure of 3000 psi. The setting fluid is allowed to cure for the length of time necessary for the composition to set. After the composition has set, the curing mould is placed into a water cooling bath until the setting fluid sample is tested.

General Measurement Terms

Unless otherwise specified or unless the context otherwise clearly requires, any ratio or percentage means by weight.

If there is any difference between U.S. or Imperial units, U.S. units are intended. For example, "gal/Mgal" means U.S. gallons per thousand U.S. gallons.

The barrel is the unit of measure used in the US oil industry, wherein one barrel equals 42 U.S. gallons. Standards bodies such as the American Petroleum Institute (API) have adopted the convention that if oil is measured in oil barrels, it will be at 14.696 psi and 60° F., whereas if it is measured in cubic meters, it will be at 101.325 kPa and 15° C. (or in some cases 20° C.). The pressures are the same but the temperatures are different—60° F. is 15.56° C., 15° C. is 59° F., and 20° C. is 68° F. However, if all that is needed is to convert a volume in barrels to a volume in cubic meters without compensating for temperature differences, then 1 bbl equals 0.159 m$^3$.

Unless otherwise specified, mesh sizes are in U.S. Standard Mesh.

The micrometer (μm) may sometimes be referred to herein as a micron.

Biodegradability

Biodegradable means the process by which complex molecules are broken down by micro-organisms to produce simpler compounds. Biodegradation can be either aerobic (with oxygen) or anaerobic (without oxygen). The potential for biodegradation is commonly measured on well fluids or their components to ensure that they do not persist in the environment. A variety of tests exist to assess biodegradation.

As used herein, a substance is considered "biodegradable" if the substance passes a ready biodegradability test or an inherent biodegradability test. It is preferred that a substance is first tested for ready biodegradability, and only if the substance does not pass at least one of the ready biodegradability tests then the substance is tested for inherent biodegradability.

In accordance with Organisation for Economic Co-operation and Development ("OECD") guidelines, the following six tests permit the screening of chemicals for ready biodegradability. As used herein, a substance showing more than 60% biodegradability in 28 days according to any one of the six ready biodegradability tests is considered a pass level for classifying it as "readily biodegradable," and it may be assumed that the substance will undergo rapid and ultimate degradation in the environment. The six ready biodegradability tests are: (1) 301A: DOC Die-Away; (2) 301B: CO2 Evolution (Modified Sturm Test); (3) 301C: MITI (I) (Ministry of International Trade and Industry, Japan); (4) 301D: Closed Bottle; (5) 301E: Modified OECD Screening; and (6) 301F: Manometric Respirometry.

In accordance with OECD guidelines, the following three tests permit the testing of chemicals for inherent biodegradability. As used herein, a substance with a biodegradation or biodegradation rate of >20% is regarded as "inherently primary biodegradable." A substance with a biodegradation or biodegradation rate of >70% is regarded as "inherently ultimate biodegradable." As used herein, a substance passes the inherent biodegradability test if the substance is either regarded as inherently primary biodegradable or inherently ultimate biodegradable when tested according to any one of three inherent biodegradability tests. The three tests are: (1) 302A: 1981 Modified SCAS Test; (2) 302B: 1992 Zahn-Wellens Test; and (3) 302C: 1981 Modified MITI Test Inherent biodegradability refers to tests which allow prolonged exposure of the test compound to microorganisms, a more favorable test compound to biomass ratio, and chemical or other conditions which favor biodegradation.

Solution to Lost Circulation

One of the biggest challenges industry faces today is lost circulation due to natural fractures or cavernous or vugular formations, for example, where the fluid loss is greater than about 100 bph (barrels per hour) or where no returns are observed. Because of the size and number of fractures (and also due to their interconnectivity), drilling may have to be performed blind (dry) with no returns. However, in most extreme cases such as these, drilling simply cannot continue—or else the hole will collapse.

In cases of extreme lost circulation, a lost-circulation fluid is usually needed that is pumped and sets in the fluid flow path. However, in most cases, the prior systems are considered a last resort.

For example, hydraulic cement, due to its ability to bond to the formation, may help in controlling severe lost circulations. However, hydraulic cement requires specialized pumping equipment because it cannot be pumped through typical bottom hole tool assemblies. This involves lot of time and cost in tripping out the drilling string, pumping a cement, and then tripping in again. In addition, hydraulic cement often has undesirable curing conditions (such as high temperature dependency and being sensitive to mild contaminations). These reasons, among others, often prevent well operators from using hydraulic cement systems to cure severe lost circulation.

Another system used for controlling losses in case of no returns is known as "gunk squeeze pills". These function by having two different reactive components pumped simultaneously downhole—one down the annulus and one down the drill string. The two components react with each other immediately upon contact. However, there is a chance that the dual-component system will react in the wrong location—either in the drill string or in the annulus, rather than below a bottom hole assembly. This would cause additional steps to remediate.

Well service companies usually get lot of resistance from the well operators for using the prior existing solutions considering the time and cost involved. Solutions for controlling or stopping severe to total lost circulations have always been much sought after. A solution that could reduce severe to total drilling fluid losses is considered to be a significant factor in keeping up the drilling rate (ROP). Operators always keep asking for a solution that can be pumped through the drill string and BHA.

Considering the challenges and limitations of prior systems for controlling lost circulation, according to the invention a fluid is provided that has the following characteristics: (a) at least a sufficiently low apparent viscosity or at least a sufficiently low consistency to be pumped through a typical bottom hole assembly, such that tripping out or having a requirement for specialized bottom hole assembly can be avoided; (b) at least a sufficiently high initial gel strength at low shear, but still being "pumpable" with drilling fluid pumps (that is, a shear-thinning fluid), such that when the fluid reaches the lost circulation zone the fluid will rest inside the flow path of a large natural fracture, and, due to the reduction in shear rate within the flow path, the fluid will thicken, preferably to a gel state; and (c) the ability to "set" over time, causing the fluid to solidify and harden into an immovable solid material within the lost circulation zone.

In addition, the fluid optionally contains a solid particulate that can help in plugging small fractures or pores of the formation, which may also provide additional gel stability and strength to the fluid or additional stability and strength to the material after it sets. In certain embodiments fibers can be used for such purposes; however, fibers longer than about 3 mm can sometimes pose pumpability restrictions, especially when included in high concentrations, making the use of long fibers undesirable in some cases. For example, additional equipment may be required to cause a fluid containing long fibers to by-pass certain types of downhole tools. Generally, fibers less than 3 mm long are acceptable for not causing pumpability restrictions for fluid, that is, for not unduly increasing the apparent viscosity or consistency of the fluid. It should be understood, of course, that the inclusion of any fibers is optional.

A purpose of the invention is to provide a lost-circulation material ("LCM") pill formulation that exhibits shear-thinning behavior and possesses a relatively high viscosity under static (non-shear) conditions. In addition, a purpose of the invention is to provide such a LCM fluid that can set downhole. One of the purposes of such a fluid is to control severe loss of drilling fluid. Due to the shear-thinning capabilities of an LCM pill according to this invention, this fluid can be pumped through most bottom-hole assemblies or drill strings without tripping out the drill string of the hole to replace with specialized fluid-loss control equipment and associated methods. It is a particular advantage of certain embodiments that can optionally avoid the inclusion of fibers in the LCM pill.

The invention provides a method of treating a well, the method including the steps of: (A) forming a well fluid including: (i) a shear-thinning aqueous liquid phase; and (ii) an inorganic setting material; wherein the well fluid is shear-thinning, pumpable, and settable; and (B) introducing the well fluid into the well.

In an embodiment, the well fluid forms a solid within at most 2 hours at a temperature as least as high as a design temperature for the method.

In an embodiment, the shear-thinning aqueous liquid phase is or includes water, a viscosity-increasing agent, and a cross-linking agent. For example, the viscosity-increasing agent can be selected from the group consisting of: a water-soluble polysaccharide, a water-soluble polysaccharide derivative, and any combination thereof. In a presently preferred embodiment, the viscosity-increasing agent can be or include a guar derivative, such as hydroxy propyl guar. In an embodiment, the cross-linking agent for the viscosity-increasing agent can be a borate compound. In such an embodiment, for example, the shear-thinning aqueous liquid phase has a pH greater than 8. The shear-thinning aqueous liquid phase can optionally include a water-soluble inorganic salt, such as an alkali metal halide, for example, sodium chloride or potassium chloride.

In another embodiment, the inorganic setting material is or includes a nano-particulate. In an embodiment, the shear-thinning aqueous liquid phase is or includes a nano-particulate sol. In a preferred embodiment, the nano-particulate sol is or includes a silica sol. In such an embodiment, the shear-thinning aqueous liquid phase has a pH greater than 8. The shear-thinning aqueous liquid phase can optionally include a water-soluble inorganic salt, such as an alkali metal halide, for example, sodium chloride or potassium chloride. For an embodiment including a silica sol, the shear-thinning aqueous liquid phase preferably has an ionic strength less than 0.75.

For an embodiment including a silica sol, the shear-thinning aqueous liquid phase can additionally include a water-soluble chemical activator for gelling the silica sol. In an embodiment, for example, the water-soluble chemical activator is selected from the group consisting of: (a) phytic acid; an alkali metal salt or ammonium salt thereof; (b) methylglycinediacetic acid, an alkali metal salt or ammonium salt thereof; (c) a water-soluble polyepoxysuccinic acid and an alkali metal salt or ammonium salt thereof; and (d) salicylic acid, ascorbic acid, tannic acid, and an alkali metal salt or ammonium salt of any of the foregoing.

Depending on the water solubility of the one or more chemicals of the inorganic setting material, the inorganic setting material can be dissolved in the aqueous liquid phase or in the form of suspended solid particulate. In an embodiment having an aqueous liquid phase with a silica sol, the sol can be gelled or set with the aid of a water-soluble chemical activator. Preferably, the inorganic setting material comprises a non-hydraulic cement. In an embodiment, the fluid does not include any hydraulic cement. In an embodiment, the inorganic setting material is selected from the group consisting of: a calcium sulfate, a water-soluble silicate, and any combination thereof In an embodiment, the well fluid additionally includes a lost-circulation material. Preferably, the lost-circulation material is a solid particulate that is chemically inert in the well fluid and in the well environment after placement of the fluid. In some embodiments, however, a lost-circulation material can be or include a water-swellable particulate or an acid soluble particulate. For example, the lost-circulation material can be selected from the group consisting of: marble, calcium carbonate (aka calcite), calcium magnesium carbonate ($CaMg(CO_3)_2$ aka dolomite), walnut shells, graphites, cellulosic materials, short fibers (less than 3 mm long), and any combination thereof. In an embodiment, the lost-circulation material has a particulate size distribution of at least 5 micrometers. Preferably, the lost-circulation material has a particle size distribution of less than 20 mm. In an embodiment, the well fluid does not include fibers. If included, a fluid-loss additive may be added to a well fluid in an amount necessary to give the desired fluid-loss control. In some embodiments, a fluid-loss material can be included in an amount of about 5 to about 200 lbs/Mgal of the well fluid.

According to the methods of the invention, the well fluid can be introduced into a zone of the well from which there is greater than 100 barrels per hour of lost circulation or no circulation return. The well fluid can be introduced into the well during drilling or without tripping out a drill string. For example, in an embodiment of the methods, the well fluid can be introduced through a drill string or bottom hole assembly. In an embodiment, the well fluid is introduced into the well without simultaneously introducing another fluid into the well.

A fluid or method according to the invention can help in controlling drilling fluid loss (lost circulation) occurring from varying sizes of fractures or flow paths in a zone. Such a fluid formulation is a solution for controlling at least some high fluid loss scenarios, including at least some total fluid loss scenarios, in case of highly vugular formations.

A fluid according to the invention can be pumped through the drill string and typical downhole assemblies. Setting time of the system can be varied by adjusting the free water in the system. System may also be used as a "Viscous Reactive Pill" for providing a firm foundation prior to placing a cement plug. As the setting time can be controlled, it can be ensured that the fluid does not set in the drill string or the annulus above the drill string. While certain concentrations of short fibers (of length less than 3 mm) can be included in certain embodiments of the fluid, the absence of longer fibers (of length greater than 3 mm) in the formulation will ensure that a bottom-hole assembly will not get plugged. Other than typically used drilling fluid pumps, no additional pumping equipment is required. The fluid can be pumped through the drill sting and BHA. No specialized diverter tools in the bottom hole assembly ("BHA") are required. Laboratory testing can readily validate the success of the formula: the gel strength of the viscous system can be measured using a conventional shearometer. The plugging ability of the fluid can be measured using tapered slot and conventional permeability plugging apparatus ("PPA").

A well fluid according to the invention can be designed in such a way that most of the material can be combined prior to its use. This would make it easier and faster to mix in the field. For example, the solid particulates, such as setting material or lost-circulation material in particulate form can be mixed in the form of a "one-sack product." The aqueous liquid phase can be optionally also be formed prior to its use or on the fly.

For example, an HPG polymer pre-hydrated in water or brine can be provided in intermediate bulk containers ("IBCs"). Before pumping, the operator would mix the "one-sack product" in the aqueous liquid phase HPG pre-hydrated polymer solution. Finally, just prior to pumping, borate crosslinking agent would be added to the mix.

Aqueous Phase

The well fluid is a water-based fluid. Preferably, the water for use in the well fluid does not contain anything that would adversely interact with the other components used in the well fluid or with the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, brine refers to water having at least 40,000 mg/L total dissolved solids.

In some embodiments, the aqueous phase of the well fluid may comprise a brine. The brine chosen should be compatible with the formation and should have a sufficient density to provide the appropriate degree of well control.

Salts may optionally be included in the well fluids for many purposes. For example, salts may be added to a water source, for example, to provide a brine, and a resulting well fluid, having a desired density. Salts may optionally be included for reasons related to compatibility of the well fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a well fluid.

Depending on the application, suitable salts for use in fluids and methods according to the invention can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Water-Soluble Polymer for Shear-Thinning Viscosity of Aqueous Liquid Phase

Viscosity-increasing agents can be used to form aqueous fluid that develop high strength gels, especially if crosslinked Some of the viscosity-increasing agents can be used to create a shear-thinning liquid. An example of such a shear-thinning fluid is a cross-linked hydroxy propyl guar ("HPG"). As described in more detail below, reacting materials such as calcium sulfate and sodium sulfate that can set are added for formulating a settable fluid for use in fluid-loss control. The viscosified or gelled fluid can also be used as a carrier fluid for loss-circulation materials, such as particulates of various sizes for plugging smaller fractures or pore throats in the rock of a zone.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

Polymers for Increasing Viscosity

Certain kinds of polymers can be used to increase the viscosity of a fluid. In general, the purpose of using a polymer is to viscosity a fluid, including for the purpose of increase the ability of the fluid to carry a particulate material.

Water-soluble polymers for increasing the viscosity of a fluid can be naturally occurring polymers such as polysaccharides, derivatives of naturally occurring polymers, or synthetic polymers. The water preferably is present in the fluid in an amount at least sufficient to substantially hydrate any viscosity-increasing agent.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (such as polyacrylamide). The most common water-soluble polysaccharides employed in well treatments are guar and its derivatives.

As used herein, a "polysaccharide" can broadly include a modified or derivative polysaccharide. As used herein, "modified" or "derivative" means a compound or substance formed by a chemical process from a parent compound or substance, wherein the chemical backbone skeleton of the parent polymer is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

A guar derivative can be selected from the group consisting of, for example, a carboxyalkyl derivative of guar, a hydroxyalkyl derivative of guar, and any combination thereof. Preferably, the guar derivative is selected from the group consisting of: carboxymethylguar, carboxymethylhydroxyethylguar, hydroxyethylguar, carboxymethylhydroxypropylguar, ethylcarboxymethylguar, and hydroxypropylmethylguar, and any combination thereof A cellulose derivative can be selected from the group consisting of, for example, a carboxyalkyl derivative of cellulose, a hydroxyalkyl derivative of cellulose, and any combination thereof. Preferably, the cellulose derivative is selected from the group consisting of: carboxymethylcellulose, carboxymethylhydroxyethylcellulose, hydroxyethylcellulose, methylcellulose, ethylcellulose, ethylcarboxymethylcellulose, and hydroxypropylmethylcellulose.

Xanthan gum (commonly referred to simply as xanthan) is a multi-chain polysaccharide, derived from the bacterial coat of *Xanthomonas campestris*. It is produced by fermentation of glucose, sucrose, or lactose by the *Xanthomonas campestris* bacterium. After a fermentation period, the polysaccharide is precipitated from a growth medium with isopropyl alcohol, dried, and ground into a fine powder. Later, it is added to a liquid medium to form the gum.

Synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-viscosity-increasing agents are polymers or copolymers consisting of: various ratios of acrylic, acrylamide, acrylamidomethylpropane sulfonic acid, quaternized dimethylaminoethylacrylate, quaternized dimethylaminoethylmethacrylate, combinations thereof, and the like.

The viscosity-increasing agent can be provided in any form that is suitable for the particular well fluid or application. For example, the viscosity-increasing agent can be provided as a liquid, gel, suspension, or solid additive that is admixed or incorporated into a well fluid.

If used, a viscosity-increasing agent may be present in the well fluids in a concentration in the range of from about 0.01% to about 5% by weight of the continuous phase therein.

The viscosity-increasing agent should be present in a well fluid in a form and in an amount at least sufficient to impart the desired viscosity to a well fluid.

Crosslinking of Polymer to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. The viscosity of base gels of guar is typically about 20 to about 50 cp. When a base gel is crosslinked, the viscosity is increased by 2 to 100 times depending on the temperature, the type of viscosity testing equipment and method, and the type of crosslinker used.

The degree of crosslinking depends on the type of viscosity-increasing polymer used, the type of crosslinker, concentrations, temperature of the fluid, etc. Shear is usually required to mix the base gel and the crosslinking agent. Thus, the actual number of crosslinks that are possible and that actually form also depends on the shear level of the system. The exact number of crosslink sites is not well known, but it could be as few as one to about ten per polymer molecule. The number of crosslinks is believed to significantly alter fluid viscosity.

For a polymeric viscosity-increasing agent, any crosslinking agent that is suitable for crosslinking the chosen monomers or polymers may be used.

Cross-linking agents typically comprise at least one metal ion that is capable of cross-linking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof Some crosslinking agents do not form substantially permanent crosslinks, but rather chemically labile crosslinks with viscosity-increasing polymer molecules. For example, a guar-based gelling agent that has been crosslinked with a borate-based crosslinking agent does not form permanent cross-links Borates have the chemical formula $B(OR)_3$, where B=boron, O=oxygen, and R=hydrogen or any organic group. At higher pH ranges, e.g., 8 or above, a borate is capable of increasing the viscosity of an aqueous solution of a water-soluble polymeric material such as a galactomannan or a polyvinyl alcohol. Afterwards, if the pH is lowered, e.g., below 8, the observed effect on increasing the viscosity of the solution can be reversed to reduce or "break" the viscosity back toward its original lower viscosity. It is also well known that, at lower pH ranges, e.g., below 8, borate does not increase the viscosity of such a water-soluble polymeric material. This effect of borate and response to pH provides a commonly used technique for controlling the cross-linking of certain polymeric viscosity-increasing agents. The control of increasing the viscosity of such fluids and the subsequent "breaking" of the viscosity tends to be sensitive to several factors, including the particular borate concentration in the solution.

Without being limited by any particular theoretical explanation, a borate is believed to be capable of forming labile bonds with two alcohol sites of other molecules. This ability of a borate to react with the alcohol sites can be employed to "cross-link" alcohol sites on different polymer molecules (or possibly other parts of the same molecule) that find their way in a solution to become adjacent to one another. The pH of an aqueous solution controls the equilibrium between boric acid and borate anion in solution. At higher pH ranges, the equilibrium shifts toward a higher concentration of borate ion in the water.

For example, by increasing the pH of a fluid to 8 or above, although usually in the range of about 8.5-12, a borate-releasing compound such as boric acid releases borate ions, which become available for cross-linking a water-soluble polymer having alcohol sites. By subsequently lowering the pH of the fluid to a pH of below 8, for example, by adding or releasing an acid into the fluid, the equilibrium shifts such that less of the borate anion species is in solution, and the cross-linking can be broken, thereby returning such a crosslinked fluid to a much lower viscosity.

Regardless of the theoretical chemical mechanism of borate cross-linking, which may not yet have been perfectly elucidated and understood, borates are widely used in the oil and gas industry to selectively control an increase and subsequent break in the viscosity of a water-based well fluid containing a water-soluble polymeric material having alcohol sites. A fluid having a viscosity greater than that of water can be useful in various well treatments. If desired, after having served the intended purpose of a fluid having an increased viscosity, the viscosity of the fluid can be broken to help return the fluid back to the surface as some of the produced water.

Where present, the cross-linking agent generally should be included in the fluids in an amount sufficient, among other things, to provide the desired degree of cross linking or viscosity increase or gelling. In some embodiments, the cross-linking agent may be present in the well fluids in an amount in the range of from about 0.01% to about 5% by weight of the well fluid.

Nano-Particulate Sols for Shear-Thinning Viscosity of Aqueous Liquid Phase

Nano based particulate sols tend to develop very high strength gels when mixed with water-soluble inorganic salts (such as alkali halides, KCl, NaCl, etc.) or with activators. The gelling of the sol can be controlled with temperature and also with time (depending on the concentration of salt or other activator). Examples of Nano Particulate Sols include, but not limited to, nano silica suspensions and nano alumina suspensions.

As described in more detail below, reacting materials such as calcium sulfate and sodium sulfate that can set are added for formulating a settable fluid for use in fluid-loss control. The gelled form of this material can also be used as a carrier fluid for loss-circulation materials, such as particulates of various sizes for plugging smaller fractures or pore throats in the rock of a zone.

Dispersions of solid colloidal particles in a liquid water phase that are readily commercially available include sols of oxides of silicon, aluminum, antimony, tin, cerium, yttrium and zirconium. The particles are mostly spherical with particles sizes usually ranging from about 4 nm to about 250 nm, but elongated particles, with a length up to 300 nm are also available and believed to be acceptable. The particles may have a negative or positive charge, which electrostatic charges help keep the particles dispersed in the liquid continuous phase. The colloidal dispersion is handled as a liquid, which appears transparent in the case of relatively low concentration of particles, becoming opalescent or milky at higher concentration.

The oxide of silicon is silicon dioxide ($SiO_2$), which is more commonly known as silica. Silica is the most common material in the Earth's crust, occurring as sandstone or sand. Dispersions of silica, commonly referred to as silica sols, are widely commercially available and relatively inexpensive. Silica sols are commonly available at concentrations ranging between 1 and 70 wt %. In any case, the dispersion may be handled as a liquid, which greatly simplifies its use in the forming of well fluids.

Silica sols are stable at a pH between about 9 to about 12. Commercially available silica sols commonly have a pH in the range of about 9.5 to about 10.5. This stability is mainly because of silica-particle repulsion resulting from surface ionization in alkaline solution.

There is no interaction of silica sol with hydrocarbon liquids. Silica sol is a non-combustible material. The product is stable under normal conditions of storage and reactivity. It can have a dangerous chemical reaction with powerful oxidants, however. It is non toxic product, giving only light irritation in contact with eye or skin. Silica sol has NFPA ratings of Fire 0, Health 1, and Reactivity 0. It has no hazardous decomposition products.

These characteristics make silica sols easy to transport and store on field locations without posing safety hazards.

Freezing temperatures cause crystals of ice to form in colloidal silica solutions, which increases the concentration of silica in the unfrozen portion and accelerates gelation of the silica-rich fraction. On thawing, the gelled silica does not redisperse but remains as a sediment. As a result, the melted material also contains a reduced concentration of dispersed silica particles and is usually unsuitable for use. Irreversible gelation of colloidal silica at temperatures below 0° C. can be prevented by mixing the colloidal silica solution with an anti-freeze for water, more technically known as a free-point depressant. Common examples of freeze-point depressants include ethylene glycol, propylene glycol, or methanol, which can be included in a silica sol at a concentration comprising from 0.1 to 10 wt %, preferentially between 0.1 and 5 wt %, depending on the freeze point depression desired.

Gelling of Silica Sols

The electrical repulsion between the same charged particles stabilizes the dispersion. Disturbance of the charge balance, for instance by removing the water, changing the pH, adding salt, or adding water-miscible organic solvent, can cause the colloidal particles to aggregate, resulting in the formation of a gel.

Gelling of the non-aggregated colloidal silica sol results in a semi-solid or solid gel state, which according to an embodiment of the invention can be used to plug the formation interstices.

Gelation time can be affected by a number of factors. For example, without being bound by any theory, it is believed that upon the addition of a pH modifier or an ionic-strength modifier, the inter-particle collision rate is increased and siloxane bonds (Si—O—Si) are formed.

Both low and high pHs can cause long gelling times and intermediate pHs shorter gelling times. Generally, the pH upon initial injection into the treatment zone should be between 1 and 10, preferably between about 5 and 9, most preferably between 5.5 and 7.5. Buffers can be added, if desired, to adjust the initial pH or to help keep the pH of the solution within a desired range. Once the aqueous solution of the colloidal silica sol has been gelled, the pH can be varied between 1 or less and about 10 without significantly affecting gel properties. Thus, treatment of the well with HCl can be effected without dissolving the gel used to plug the leak or the permeable zone.

The total ionic strength of the colloidal silica sol also will affect gelling. In general, the total ionic strength should be less than about 10, preferably less than 3.5, and most preferably 0.75 or less (sea water is about 0.72). Inorganic ions such as potassium, sodium, magnesium, calcium, chloride, sulfate, bisulfate, carbonate, or bicarbonate may be present naturally in the water used to prepare the solution, or they may be added intentionally so as to adjust the ionic strength. Divalent or multivalent cations have a greater effect on gel time than their contribution to ionic strength would indicate. In field operations, the ionic strength of the treatment solution is one variable that can be adjusted to achieve a desired gel time. (For a definition of ionic strength, see W. J. Moore, Physical Chemistry, 4th edition, Prentice Hall, Inc., New Jersey, 1972, pg. 443.) Once the silica sol has been gelled, it insensitive to being contacted with water or brines.

Smaller particle size can promote faster gelling of the non-aggregated colloidal silica sol. Not only is particle size of the colloidal silica sol a factor in the rate at which the colloidal silica gel is formed, so is the concentration of the colloidal silica sol in the aqueous solution. Higher concentration of silica sol in the aqueous solution promotes higher gelling rates.

The temperature of the aqueous solution of the silica sol also affects the formation of the colloidal silica gel; higher temperatures generally favoring more rapid gelling. Gels can be formed from the aqueous non-aggregated colloidal silica sols at temperatures from 5° C. to 200° C. or higher. Such gels are stable indefinitely at temperatures between 5° C. and 200° C. and are stable for a few days at temperatures as high as 260° C. In addition, because of the exceptionally low permeability, silica gels can withstand contact by fluids having temperatures as high as 350° C., e.g., steam.

From the time that the well fluid begins to gel, the shear strength of fluid increases over a period of time. The mechanical strength of gelled silica sols may increase over a period of several days. A higher temperature may promote the development of higher shear strength and higher ultimate mechanical strength.

The foregoing gelling factors do not function independently of one another; they act in concert. For example, at pH greater than roughly 8.5, high ionic strengths can cause colloidal silica solutions to separate into a clear, aqueous layer and a turbid, silica-rich layer instead of forming a space-filling gel. At lower pH's, however, gels form in the presence of much higher ionic strengths.

Selecting Silica Sol for Treatment Applications

Silica sols with particle sizes ranging between about 4 nanometers and about 100 nanometers have been found to have an excellent injectivity in formations with permeabilities as low as 1 mD to 50 mD. This unique property allows a treatment of the formation to a desired depth from the wellbore. Preferably, the silica particles are less than 40 nanometers. Most preferably, the colloidal particles have a size between 4 and 22 nanometers.

In general, silica sol concentrations in the range between 1 and 70 weight percent colloidal silica can be used. Commercial silica sols are typically available at concentrations running between 30 and 50 weight percent. Commercial sols can be used at such high concentrations or diluted to a lower silica content, depending on the treatment design criteria. For example, sols containing between 25 or 30 wt % of silica as a lower limit and 50 or 70 wt % of silica as an upper limit are generally used, but may be diluted down to 2 wt % where a hard gel is not necessary. Note that the volume of injected solution typically remains the same when diluted solutions are used but a gel of less rigidity is obtained.

For example, sols containing 2 to 40 weight percent of silica are generally used. Desired colloidal silica concentrations may vary with the use to which the colloidal silica solutions are put. For example, a fluid that is used to treat regions that are close to the wellbore preferably contain greater than 7.5 weight percent colloidal silica.

The desired gel time will vary depending upon the circumstances. If, for example, one wishes to plug a formation that is at or near the wellbore, or if the aqueous solution of the colloidal silica sol can be pumped into the desired part of the formation rapidly, then short gel times, e.g., ranging from a few minutes to 12 hours, are desired.

Chemical Activators to Help Control Gelling of Silica Sol

In addition to the forgoing factors for controlling the gelling and gel time of a silica sol, a chemical activator for use according to the invention should be, in order of priority: (a) selected from the group consisting of: organophosphonates, aminocarboxylic acids, hydroxypolycarboxylates, phenolic acid, polyphenolic acid, ascorbic acid, and an alkali metal salt or ammonium salt of any of the forgoing; (b) selected for being water soluble; (c) selected for being biodegradable, preferably for passing at least one of the ready biodegradability tests; (d) selected for being of a natural plant product; and (e) of relatively low cost.

More preferably, one or more of the following chemical activators can be used to cause or help control gelling of a silica sol:
(a) phytic acid, and an alkali metal salt or ammonium salt thereof;
(b) methylglycinediacetic acid, and an alkali metal salt or ammonium salt thereof;
(c) a water-soluble polyepoxysuccinic acid, and an alkali metal salt or ammonium salt thereof; and
(d) salicylic acid, ascorbic acid, tannic acid, and an alkali metal salt or ammonium salt of any of the foregoing.

It is believed that all of these chemical activators are biodegradable, and, most likely, would pass at least one of the tests for ready biodegradability.

Phytic acid is an organophosphonate that is naturally found in hulls of nuts, seeds and grains. The chemical structure of phytic acid is:

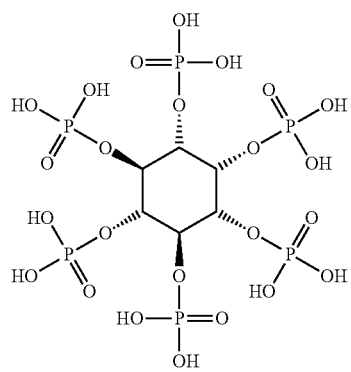

The structure of methylglycinediacetic acid (sometimes referred to as "MGDA" or a-alaninediacetic acid) is shown below:

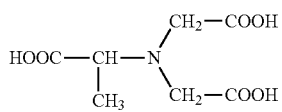

The structure of suitable water-soluble polyepoxysuccinic acids and their derivatives is represented below:

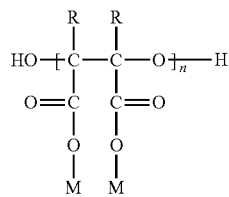

Notes: n = 2-10
M: $Na^+$ or $H^+$, $K^+$, $NH_4^+$
R: H or $C_{1-4}$alkyl

In presence of activators described in this invention, the particle collision of nano silica causes the aggregation into long chain-like networks and forms the gel. This particle collision is possible by increasing the temperature and reducing pH of stable alkaline solution. Collision of particles forms the bonding that might be caused by formation of siloxane (Si—O—Si) bonds at inter-particle contacts. This bonding is believed to be catalyzed by hydroxide ions. Gelation time is the time when particle aggregates complete and forms uniform three-dimensional networks of long, bead-like strings of silica particles.

The nano silica gelling can be at least partially controlled by varying the concentration of such a chemical activator.

The gelling tendency of the system can be accelerated by changing the pH of the system from basic to acidic. In a moderately acidic pH range, the rate of the gel formation is increased (but not in a highly acidic pH range).

In addition, these activators show no precipitation with nano silica after mixing or at elevated temperatures.

Without being limited by any theory, the chemical activators used according to the invention are believed to not thermally hydrolyze or thermally decompose at a design temperature for the method of treating to release an acid or base.

As dissolved divalent or multivalent ions may interfere with the chemical activator, in an embodiment, the continuous aqueous phase of the water-based well fluid has an ionic strength less than 0.75. In another embodiment, the continuous aqueous phase of the water-based well fluid comprises dissolved divalent and multivalent cations in a total concentration that is stoichiometrically less than 50% of the concentration of any first and second carboxylic acid functional groups of the chemical activator. Preferably, the continuous aqueous phase of the water-based well fluid comprises dissolved divalent and multivalent cations in a total concentration that is stoichiometrically less than 5% of any first and second carboxylic acid functional groups of the chemical activator. More preferably, the continuous aqueous phase of the water-based well fluid comprises dissolved divalent and multivalent cations in a total concentration that is stoichiometrically less than 1% of any first and second carboxylic acid functional groups of the chemical activator.

Theoretical Discussion of Silica Sol System with Activators

Nano silica sol is dispersion of discrete particles of amorphous silicon dioxide ($SiO_2$). Commercial nano silica is stable at a moderate pH of 9.5 to 10.5 and at high $SiO_2$/alkali ratios. Without being limited by any theory, this stability is mainly because of silica-particle repulsion resulting from surface ionization in alkaline solution.

Without being limited by any theory, in presence of activators described in this invention (for example, phytic acid, methylglycinediacetic acid, polyepoxysuccinc acid), the particle collision of nano silica causes the aggregation into long chain-like networks to form a gel state. This particle collision is possible by increasing the temperature and reducing pH of stable alkaline solution. Collision of particles forms the bonding that might be caused by formation of siloxane (Si—O—Si) bonds at inter-particle contacts. This bonding is catalyzed by hydroxide ions. Gelation occurs when particle aggregates complete and form uniform three-dimentional networks of long, bead-like strings of silica particles.

In the pH range of 5 to 7, because not many hydroxide ions are present, the system becomes deficient of a hydroxide catalyst. This ultimately results in low gelation time, below one hour, as can be seen in below in Table 1 Minimum gel time is exhibited in the range of 5 to 7. The increase in pH above 7 leads to surface ionization of silica particles that exhibit charge repulsion and ultimately result in increased gelation time.

TABLE 1

Effect of pH on Gelation Time of Nano Silica @ 200° F.

| pH | Gel Time |
|----|----------|
| 10 | 8 hours |
| 7 | 1 hours |
| 5 | 30 minutes |

Gelling of Silica Sol in Well Environment

The gelation of a silica sol is irreversible. It is believed that a fully gelled silica sol is relatively stable and inert, even to additional chemical activator. Thus, a gelled silica sol is stable and inert in a well environment.

The gelation of a silica sol can be utilized for controlling the fluid loss of a subterranean formation.

This system and methods are based on "green" chemicals providing environmental advantage over other approaches to the problem.

pH Adjuster or Buffer

Preferably, the initial pH of the continuous aqueous phase of the well fluid is in the range of 7 to 12.

In certain embodiments, the well fluids can include a pH-adjuster. Preferably, the pH adjuster does not have undesirable properties, as discussed above. The pH-adjuster may be present in the well fluids in an amount sufficient to maintain or adjust the pH of the fluid.

In certain embodiments, the pH-adjuster comprises a salt of an organic acid such as sodium or potassium formate, sodium or potassium acetate, sodium or potassium citrate, sodium or potassium glycolate, sodium or potassium maleate, sodium or potassium phosphate, potassium dihydrogen phosphate, cesium formate, and any combinations thereof. In some embodiments, the pH-adjuster may comprise a small amount of a strong base such as NaOH, $Na_2CO_3$, and $Mg(OH)_2$. In other embodiments, the pH-adjuster may be any other substance known in the art capable of maintaining the pH in a limited range. One of ordinary skill in the art, with the benefit of this disclosure, will recognize the appropriate pH-adjuster and amount thereof to use for a chosen application.

Well Fluid Additives

A well fluid according to the invention can contain additives that are commonly used in oil field applications, as known to those skilled in the art, provided any such additive does not adversely affect the chemistry of the system according to the invention. For example, these include, but are not necessarily limited to, brines, inorganic water-soluble salts, salt substitutes (such as trimethyl ammonium chloride), pH control additives, surfactants, oxygen scavengers, alcohols, corrosion inhibitors, clay stabilizers, sulfide scavengers, bactericides, and combinations thereof.

The use of any well fluid additive with the invention should be compatible with the other components of the fluid.

Method Steps

In general, a method of treating a treatment zone in a well is provided. The method includes the step of introducing into the well a well fluid according to the invention. The well fluid can be introduced into the treatment zone according to any convenient techniques for introducing particulates and chemicals that are known in the field.

The well fluids and methods according to the invention can be used in producing wells or injection wells.

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid of the present invention can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

In an embodiment, after introducing the well fluid into the treatment zone, the method can include a step of shutting in the treatment zone. The step of shutting in is preferably for a sufficient time at the design temperature for fully gelling of the well fluid to form a gelled state or solid state in situ.

In an embodiment, the step of flowing back is within 48 hours of introducing the well fluid into the treatment zone of the well.

Preferably, after any well treatment according to the invention, a step of producing hydrocarbon from the subterranean formation is the desirable objective.

EXAMPLES

To facilitate a better understanding of the present invention, the following examples of certain aspects of some embodiments are given. In no way should the following examples be read to limit, or define, the entire scope of the invention.

Examples with Crosslinked HPG for Aqueous Liquid Phase

Considering the desirable characteristics as stated above, a fluid based on a crosslinked hydroxy propyl guar was evaluated.

Two solids free gelling kill pills were tested for plugging capability. An aqueous solution was prepared by adding HPG polymer to a sodium bromide brine. A solid particulate as a lost-circulation material ("LCM") was added. In a first of these test fluids, the solid particulate was Ground marble 1200 (D50)/600(D50)/150(D50) in concentrations of 30 ppb/30 ppb/20 pbb, respectively. In both of these test fluids, cellulosic fibers having a typical fiber length of about 2,000 micrometers were also added. In a second of these test fluids, the solid particulate was a mixture of acid soluble particles (different sizes of ground marble) and acid soluble, swellable polymeric particles. Finally, a borate crosslinker for the polymer. This combination developed good gel strength and a lipping characteristic.

Plugging tests were performed for these two different combinations of LCM on a 2500-1000 micron tapered slot using a permeability plugging apparatus ("PPA") at 500 psi and room temperature. The permeability plugging apparatus (PPA) permits fluid loss measurement using ceramic discs available in a variety of permeabilities (5 micron to 190 micron) to simulate reservoir pore throat diameters. Filter-cake is built on the underside of the ceramic disc. This orientation eliminates the effects of settlement during formation of the filtercake. Overbalances to 2500 psig can be reproduced. The cell can be heated to 500° F. (260° C.). PPA is used extensively during optimization of pore throat bridging formulations using BARACARB™ bridging agent (sized marble). PPA results are used to evaluate the effects of varying bridging agent concentration and particle size distribution.

For these two HPG polymer test fluids, a controlled fluid loss in addition to complete plugging of the slot, was observed. The results are tabulated in Table 2. This test proves that crosslinked HPG can be used as a carrier fluid, and the presence of LCM will help in plugging.

TABLE 2

PPA test results for solids-free gelling kill pill with LCM particles and cellulosic fibers (at 500 psi and room temperature)

| Test No | Lost-Circulation Material ("LCM") | D(10)/(50)/(90) | Fiber Length (μm) | Fiber Conc. (ppb) | Slot Size, microns | Fluid loss (gms) |
|---|---|---|---|---|---|---|
| 1 | Ground marble 1200/600/150 (30/30/20) | 41/651/1291 PSD of the particulate blend | 2000 | 0.5 | 2500-1000 | 10 |
| 2 | a mixture of acid soluble particles (different sizes of ground marble) starch | 7/86/513 PSD of the particulate blend | 2000 | 0.5 | 2500-1000 | 90 |

The next test was to assess the setting capability of a cross-linked HPG polymer system for the aqueous liquid phase of a fluid according to the invention. The system included a setting material comprising calcium sulfate and sodium silicate. In addition, diatomaceous earth was included in this test formulation, which may chemically react with the calcium sulfate or sodium silicate. This system was mixed with the crosslinked HPG components mentioned in the first two tests above, with a higher concentration of LCM particulate. The components of this composition are tabulated in Table 3.

TABLE 3

Formulation of Viscous Reactive Plug

| Products | Units | Concentration | Mixing Time (minutes) |
|---|---|---|---|
| Water | 9.0 ppg | | 5 |
| Sodium Bromide | | | |
| Diatomaceous Earth (i.e., amorphous silica (opal, $SiO_2 \cdot nH_2O$)) | lb/500 ml | 30 | 5 |
| Calcium sulfate | lb/500 ml | 30 | 5 |
| Sodium silicate | lb/500 ml | 12 | 5 |
| Water or Brine | ml/500 ml | 25 | 60 |
| Hydroxyl propyl guar | lb/500 ml | 5 | |
| NaOH | lb/500 ml | 1 | 1 |
| Lost-Circulation Material ("LCM") | lb/500 ml | 42.86 | 1 |
| Borate crosslinker in liquid solvent) | ml/500 ml | 10 | Hand Mix |

Diatomaceous earth, also known as D.E. or diatomite, consists of fossilized remains of diatoms, a type of hard-shelled algae. Diatomaceous earth is a naturally-occurring, soft, siliceous sedimentary rock that is easily crumbled into a fine white to off-white powder. It has particle sizes ranging from about 1 micrometer to about 1 millimeter, but typically in the range of about 10 to about 200 micrometers. This powder has an abrasive feel, similar to pumice powder, and is very light as a result of its high porosity. The typical chemical composition of oven-dried diatomaceous earth is 80 to 90% silica, with 2 to 4% alumina (attributed mostly to clay minerals), and 0.5 to 2% iron oxide.

Sodium silicate is a white powder that is readily soluble in water, producing an alkaline solution. Sodium silicate is the common name for a compound sodium metasilicate, $Na_2SiO_3$, also known as water glass or liquid glass. It is available in aqueous solution and in solid form. In industry, the different grades of sodium silicate are characterized by their $SiO_2:Na_2O$ ratio, which can vary between 2:1 and 3.75:1. Grades with this ratio below 2.85:1 are termed "alkaline" Those with a higher $SiO_2:Na_2O$ ratio are described as "neutral". When dissolved in water, sodium silicate forms a thick paste in high concentration. Moderate heat can drive water from the silicate, which then has glass-like properties. Magnesium silicate has similar characteristics.

The test formulation of Table 3 was left for 16 hours at room temperature and 150° F. Increase in gel strength of the system was observed, but no hard setting was observed. The same system was left at room temperature for 5 days and a significant increase in gel strength was observed. This might be because the components of the formulation were not fully optimized. Optimizing the formulation is believed to require adjusting the free water and concentration of reactive components.

Examples of Nano Particulate Sols for Aqueous Liquid Phase

Considering the desirable characteristics as stated above, a fluid based on a silica sol was evaluated.

In the formulation shown in Table 4, there was no activator for the silica sol:

TABLE 4

12 ppg Formulation Example with a nano silica sol for aqueous liquid phase

| Additive | Concentration pounds per barrel (ppb) |
|---|---|
| Xanthan gum (powdered) | 1 |
| Barite (barium sulfate) | 83.5 |
| nano silica sol | 309 |

TABLE 4-continued 12 ppg Formulation Example with a nano silica sol
for aqueous liquid phase

| Additive | Concentration pounds per barrel (ppb) |
|---|---|
| Calcium sulfate hemihydrate | 30 |
| Sodium silicate | 30 |
| KCl | 50 |

This formulation of Table 4 was initially a highly viscous fluid, but set after 2 hours at 200° F.

Colloidal silica consists of dense, amorphous particles of $SiO_2$. The building blocks of these particles are randomly-distributed $[SiO_4]$-tetrahedra. This random distribution is what makes amorphous silica different from crystalline silica—ordered on a molecular level. A general principle for forming a silica sol is to remove sodium from sodium silicate via cation exchange. Without the sodium, polymerization of the silica takes place and particles begin to grow. The silica of silica sols typically has a $SiO_2/Na_2O$ ratio greater than 50.

Activator Examples for Silica Sol Base Fluid

In addition, there is also a good scope of introducing activators in this formulation to activate the gelling of the nano silica sol so as to have better control in gelling/setting with either time or temperature. An example of activator in this case could be phytic acid, which is biodegradable.

The addition of lost-circulation material ("LCM") particulates and setting materials such as calcium sulfate and sodium silicate would enhance such formulations.

Individual activators in specific concentration were mixed with nano silica sol and gelation time was evaluated at 200° F. and 300° F., respectively. The colloidal silica used in the examples is of 15% by weight. The particle size of colloidal silica used in the examples was about 20 nm. These activators show no precipitation with nano silica after mixing or at elevated temperatures. The results for each of the activators phytic acid, methylglycinediaceteic acid, and polyepoxysuccinic acid are shown in Tables 5, 6, and 7, respectively.

The system can effectively prevent water and gas flow in sandstone and carbonate formations with BHST up to 300° F. The gelation time can be controlled by adjusting the concentration of activator added to the nano silica. It gives a predictable and controllable pumping time, ranging from a few minutes to several hours at a given temperature. This is an important advantage of the present invention as it allows the sealant to remain pumpable for sufficient time for placement and develops the network structure that leads to gelation, over a predictable period of time. The gel appears as a crystalline solid. It could remain homogenous and stay in place under confined conditions, such as fractures and pore spaces.

TABLE 5

12 nm nano silica with phytic acid activator

| Activator concentration in 200 mL solution | Temperature | pH of Mixture | Gelling Time |
|---|---|---|---|
| 15 mL | 200° F. | 8.0 | 6 hours |
| 5 mL | 300° F. | 9.5 | 50 minutes |

TABLE 6

12 nm nano silica with methylglycinediacetic acid activator

| Activator concentration in 200 mL solution | Temperature | pH of Mixture | Gelling Time |
|---|---|---|---|
| 1 gram | 200° F. | 10.8 | 4 hours |
| 1 gram | 300° F. | 10.8 | 50 minutes |

TABLE 7

12 nm nano silica with polyepoxysuccinic acid activator

| Activator concentration in 200 mL solution | Temperature | pH of Mixture | Gelling Time |
|---|---|---|---|
| 5 mL | 200° F. | 10.5 | 8 hours |
| 15 mL | 200° F. | 10.4 | 6 hours |
| 5 mL | 300° F. | 10.4 | 50 minutes |

Without being limited by any theory, it is believed that in the pH range of 5 to 7, because the concentration of hydroxide ions is lower, the system becomes deficient of a hydroxide catalyst for gelation. This ultimately results in low gelation time, below one hour, as can be seen in Table 8. Minimum gel time is exhibited in the range of 5 to 7. The increase in pH above 7 leads to surface ionization of silica particles that exhibit charge repulsion and results in increased gelation time.

TABLE 8

Effect of pH on gelation time of 12 nm nano silica with activator
polyepoxysuccinic acid 1 gram at 200° F.

| pH | Gel Time |
|---|---|
| 10 | 8 hours |
| 7 | 1 hour |
| 5 | 30 minutes |

All three activators, viz. phytic acid, methylglycinediacetic acid, polyepoxysuccinic acid that were evaluated for conformance control application have equal potential to block or seal the water and gas producing zones. However, based on the longer gelation times achieved at 200° F., the following preferred activator order can be followed: polyepoxysuccinic acid>phytic Acid>methylglycinediacetic acid.

Conclusion

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of treating a well, the method comprising the steps of:
   (A) forming a fluid comprising:
      (i) a shear-thinning aqueous liquid phase, wherein the shear-thinning aqueous liquid phase comprises a nano-particulate dispersed therein;
      (ii) an inorganic setting material; and
      (iii) a water-soluble chemical activator selected from the group consisting of: (a) phytic acid, an alkali metal salt or ammonium salt thereof; (b) methylglycinediacetic acid, an alkali metal salt or ammonium salt thereof; (c) a water-soluble polyepoxysuccinic acid, an alkali metal salt or ammonium salt thereof; and (d) salicylic acid, ascorbic acid, tannic acid, and an alkali metal salt or ammonium salt of any of the foregoing;
   wherein the fluid is shear-thinning, pumpable, and settable; and
   (B) introducing the fluid into the well.

2. The method according to claim 1, wherein the fluid forms a solid within at most 0.5 hours at a temperature as least as high as a design temperature for the method.

3. The method according to claim 1, wherein the shear-thinning aqueous liquid phase comprises a viscosity-increasing agent, and a crosslinking agent.

4. The method according to claim 3, wherein the viscosity-increasing agent is selected from the group consisting of: a water-soluble polysaccharide, a water-soluble polysaccharide derivative, and any combination thereof.

5. The method according to claim 4, wherein the viscosity-increasing agent comprises a guar derivative.

6. The method according to claim 4, wherein the cross-linking agent is a borate compound.

7. The method according to claim 3, wherein the shear-thinning aqueous liquid phase has a pH greater than 8.

8. The method according to claim 3, wherein the shear-thinning aqueous liquid phase comprises a water-soluble inorganic salt.

9. The method according to claim 1, wherein the nano-particulate comprises a silica.

10. The method according to claim 9, wherein the shear-thinning aqueous liquid phase has a pH greater than 8.

11. The method according to claim 9, wherein the shear-thinning aqueous liquid phase comprises a water-soluble inorganic salt.

12. The method according to claim 9, wherein the shear-thinning aqueous liquid phase has an ionic strength less than 0.75.

13. The method according to claim 1, wherein the inorganic setting material comprises a non-hydraulic cement.

14. The method according to claim 1, wherein the inorganic setting material is selected from the group consisting of: calcium sulfate, a water-soluble silicate, and any combination thereof.

15. The method according to claim 1, additionally comprising a lost-circulation material.

16. The method according to claim 15, wherein the lost-circulation material is selected from the group consisting of: marble, calcium carbonate, calcium magnesium carbonate, walnut shells, graphites, fibers, cellulosic materials, and any combination thereof.

17. The method according to claim 15, wherein the lost-circulation material has a particulate size of at least 5 microns.

18. The method according to claim 1, wherein the fluid does not include fibers.

19. The method according to claim 1, wherein the fluid is introduced into a zone of the well from which there is greater than 100 barrels per hour lost circulation or no return.

20. The method according to claim 1, wherein the fluid is introduced into the well during drilling without tripping out a drill string.

21. The method according to claim 1, wherein the fluid is introduced through a drill string or bottom hole assembly.

22. The method according to claim 1, wherein the fluid is introduced into the well without simultaneously introducing another fluid into the well.

23. The method according to claim 1, wherein the shear-thinning aqueous liquid phase has at least 25% by weight of the nano-particulate dispersed therein.

24. The method according to claim 1, wherein the inorganic setting material comprises a water-soluble silicate.

25. The method according to claim 1, wherein the inorganic setting material comprises calcium sulfate.

26. method according to claim 1, wherein the shear-thinning aqueous liquid phase has at least 7.5% by weight of the nano-particulate dispersed therein.

* * * * *